H. Miller,
Paint Can.
N° 43,326. Patented June 28, 1864.
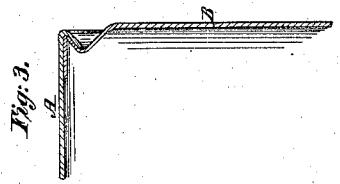
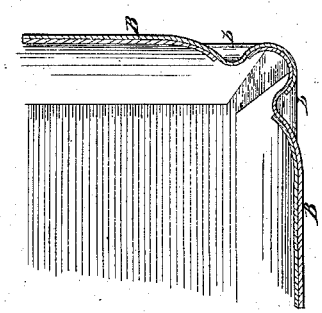
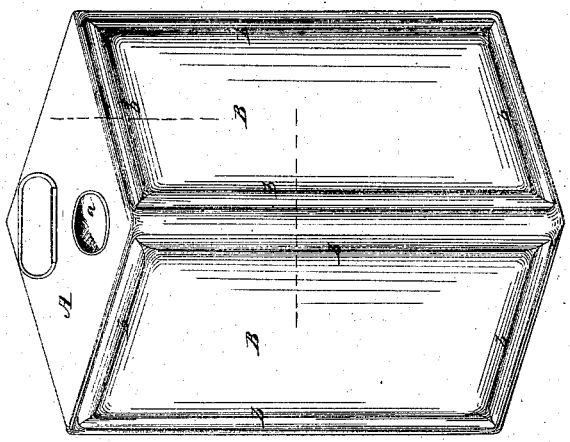
Witnesses:
Wm. T. Mc Namara
Theo. Tusch
Inventor:
Herman Miller

UNITED STATES PATENT OFFICE.

HERMAN MILLER, OF HOBOKEN, NEW JERSEY.

IMPROVED CAN FOR PAINT, FRUIT, &c.

Specification forming part of Letters Patent No. 43,326, dated June 28, 1864.

*To all whom it may concern:*

Be it known that I, HERMAN MILLER, of Hoboken, in the county of Hudson and State of New Jersey, have invented a new and useful Improvement in Paint and other Cans; and I do hereby declare that the following is a full, clear, and exact description thereof, which will enable those skilled in the art to make and use the same, reference being had to the accompanying drawings, making a part of this specification, in which—

Figure 1 is a perspective view of a complete can made according to my improvement. Figs. 2 and 3 are sectional views of parts of the edges of a can.

My improved can is especially intended for the reception of paint and other substances of a heavy nature which require that the package in which they are put up shall be strong and durable. My improvement may, however, be employed for the reception of fruit and substances of every description. The cans here shown are to be usually made of ordinary sheet-tin, but any other suitable metal may be employed.

The object of my invention is to impart increased strength and stiffness to the can, and also to facilitate the soldering of the edges or joints of the sheets of tin where they lap; also, to promote the tight sealing of the joints, thereby preventing leakage.

A is the top of the can, formed of a single sheet of tin, with an orifice, a, through which the paint or other substance is introduced; B B, the sides of the can, each side composed of a single plate or sheet, and having a groove, b, sunk in the sheet near the edges thereof, which I term the "solder-groove." The edges are rounded and fit one over the other, as shown in Fig. 2, the edge of the outer sheet terminating within the groove, as shown. The groove b serves as a guide to the point of the workman's soldering-tool, and the groove also holds the solder in place before it becomes heated, and likewise concentrates the molten solder upon the joint and prevents it from running away from the joint, so that the joint will be sealed with certainty. In the ordinary cans the edges of the sheets are simply bent one over the other at right angles and then soldered; but it is difficult for the workman to keep the solder upon the joint, as the exterior surface of the can at the joint is flat and the solder runs from the joint and spreads upon the outside of the can, and also slips through between the flat edges of the joints and thus also escapes, resulting often in leakages unperceived by the workman at the time of soldering.

Another important advantage of my improvement is that by the use of the solder-grooves b the edges of the can are greatly strengthened, owing to the stiffness imparted by the corrugation of the edges of the plates in the formation of the said grooves. The plates which form the top and bottom of the can are bent over, so as to rest in the solder-groove b, as shown in the drawings, Fig. 3. Thus all the edges of the can are rounded and strengthened and a general stability is imparted to the can, while the soldering is more quickly done, with greater certainty of preventing leakage, and with a less amount of solder, because the grooves b catch and hold the solder, preventing loss thereof.

Having thus described my invention, I claim as new and desire to secure by Letters Patent—

Having the plates provided with solder-grooves b, in combination with the turning of the edges of the plates into said solder-grooves, substantially in the manner and for the purpose herein shown and described.

HERMAN MILLER.

Witnesses:
M. M. LIVINGSTON,
THEO. TUSCH.